F. F. COGGIN.
LOCKING DEVICE FOR TRAIN PIPE COUPLINGS.
APPLICATION FILED NOV. 18, 1915.

1,197,796.

Patented Sept. 12, 1916.
7 SHEETS—SHEET 1.

Frank F. Coggin
INVENTOR.
BY Barnett & Truman
ATTORNEYS

F. F. COGGIN.
LOCKING DEVICE FOR TRAIN PIPE COUPLINGS.
APPLICATION FILED NOV. 18, 1915.

1,197,796.

Patented Sept. 12, 1916.
7 SHEETS—SHEET 2.

Frank F. Coggin
INVENTOR.

BY Barnett & Freeman

ATTORNEYS

F. F. COGGIN.
LOCKING DEVICE FOR TRAIN PIPE COUPLINGS.
APPLICATION FILED NOV. 18, 1915.

1,197,796.

Patented Sept. 12, 1916.
7 SHEETS—SHEET 4.

Frank F. Coggin
INVENTOR.

BY Barnett & Truman
ATTORNEYS

UNITED STATES PATENT OFFICE.

FRANK F. COGGIN, OF NEWARK, NEW JERSEY, ASSIGNOR TO EGBERT H. GOLD, OF CHICAGO, ILLINOIS.

LOCKING DEVICE FOR TRAIN-PIPE COUPLINGS.

1,197,796.   Specification of Letters Patent.   Patented Sept. 12, 1916.

Application filed November 18, 1915. Serial No. 62,211.

*To all whom it may concern:*

Be it known that I, FRANK F. COGGIN, a citizen of the United States, residing at Newark, in the county of Essex and State of New Jersey, have invented certain new and useful Improvements in Locking Devices for Train-Pipe Couplings, of which the following is a specification.

My invention relates to locking means for train pipe couplings, and the primary object of the invention is to utilize the fluid pressure in the train line for supplementing or making more secure, reliable and effective the devices employed for locking together the coupler heads so that they cannot be accidentally uncoupled, for example, in going around sharp or reverse curves.

The invention contemplates, more particularly, supplying a coupler head with a fluid pressure actuated device which will absorb looseness in the locking mechanism so that, whenever the train line is under pressure, the coupler heads will be maintained in an intimate engagement, preventing the possibility of leakage and the accidental disturbance of the lock.

A further and more specific object of the invention is to provide an improvement in the well known type of locking device for car couplers which consists of a hook or link pivoted to a coupler head and adapted to engage with a lug on the mating coupler head. Locking devices of this sort are not ordinarily effective to hold the coupler heads in intimate engagement one with the other. There is usually some looseness between the hook and the coupler heads due to wear, stretching or bending of the hook, or to the original design of the device, since obviously, considering the likelihood of variation between different couplers, it is not expedient or possible to attempt to make the hook of exactly the length required to draw one coupler head tightly against the other.

My invention, viewed specifically, has for its object to utilize the pressure in the train line for absorbing the looseness between the hook and the coupler heads, thereby making the locking mechanism more effective and reliable.

The invention has for further objects such other constructions, arrangements and devices relating to train pipe couplings as will be hereinafter described and claimed.

The invention is illustrated, in certain preferred embodiments, in the accompanying drawings.

Like characters of reference designate like parts in the several figures of the drawings.

Referring first to Figs. 1 to 6 inclusive, A and B are coupler heads of the familiar gravity type, each provided with a locking arm 25 engaging an undercut lug 26 on the side of the mating head, as is customary in couplers of this type. The coupler heads A and B are shown as provided with pivoted locking hooks or links C, D, which are adapted to engage lugs E, F on the mating heads. For the reasons stated above, the engagement of the links with the heads is necessarily, to some extent, a loose engagement. My invention, when utilized as an improvement upon this type of coupler, provides means for taking up this looseness. The improvement is shown as applied to only one of the coupler heads, namely, the head A. Obviously the coupler head B might be similarly constructed. However, the improvement of my invention is of such character that a coupler head constructed in accordance therewith may be coupled up with a head which is not provided with the improvement.

The coupler head A is formed with a recess 27 in the top communicating by an opening 28 with the steam port 29 of the coupling. In the recess is arranged a diaphragm 30 held in place by a threaded plug 31 provided with a hollow, upwardly extending projection 32. The lug F, instead of being cast integral with the coupler head, is made of a separate piece of metal and is provided with a threaded stud 33 which screws into the coupler head so that the lug is brought down upon the edge of the plug 31. The locking link C has a bend 34 at one end adapted to engage the lug E on coupler head B, the other end being provided with a transversely bent portion 35 which extends through a transverse opening 36 in the projection or housing 32, the link being held in place in the housing by a washer 37 and screw 38. Within the housing and pivoted to a cross pin 39 therein is a bell crank lever 40, one end of which bears on a button 41 on the diaphragm 30, the other end of which has a rounded surface 42 bearing against the transverse portion 35 of link C. The latter is seated loosely in a recess 43 within the housing.

Figure 1:
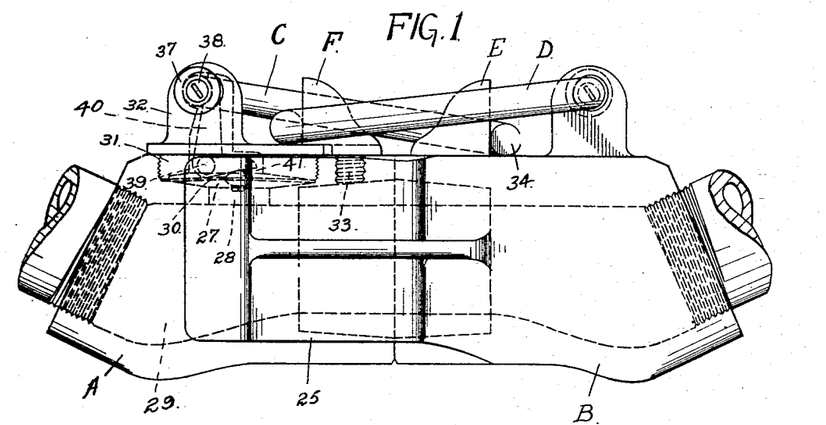
Figure 1 is a side elevation of a train pipe coupling provided with pivoted locking hooks or links, one of the coupler heads of the coupling being furnished with a pressure actuated device constructed in accordance with my invention for absorbing the slack between the locking hook and the coupler heads.
Figure 2:
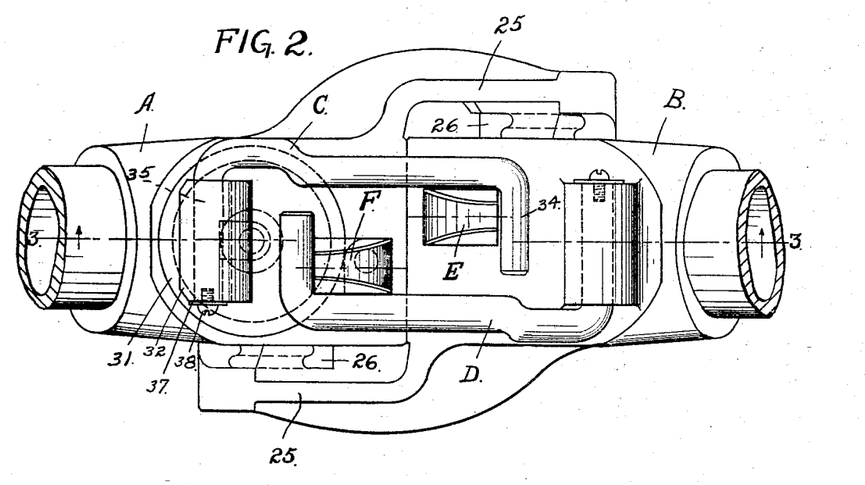
Fig. 2 is a plan view of the coupling shown in Fig. 1.
Figure 3:
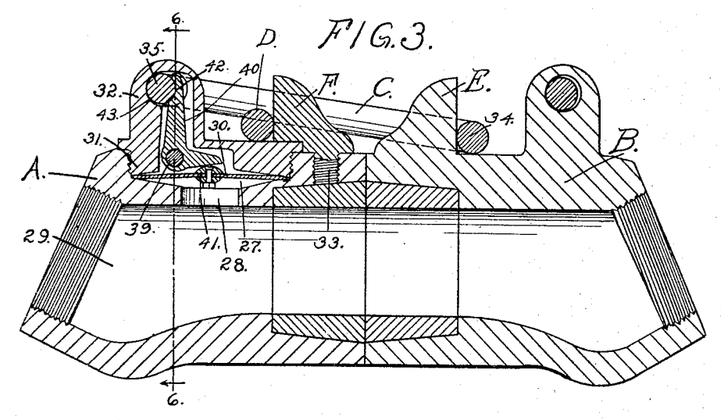
Fig. 3 is a longitudinal sectional view taken on line 3—3 of Fig. 2, omitting the hose nipples.
Figures 4, 5, 6:
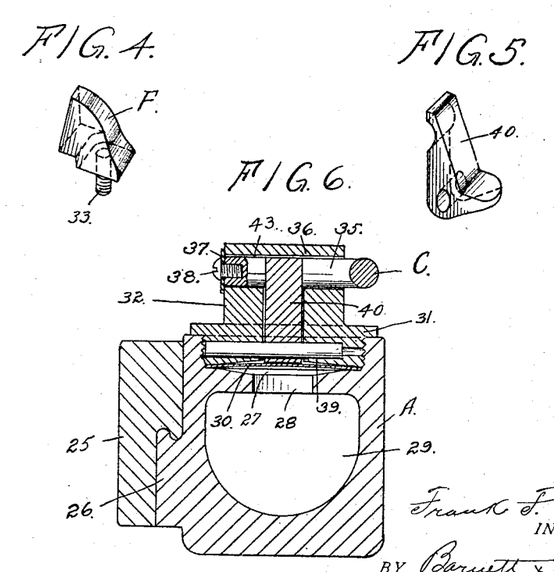
Figs. 4 and 5 are detail views, in perspective, of parts of the coupling shown in the preceding figures.
Fig. 6 is a cross sectional view taken on line 6—6 of Fig. 3.
Figure 7:
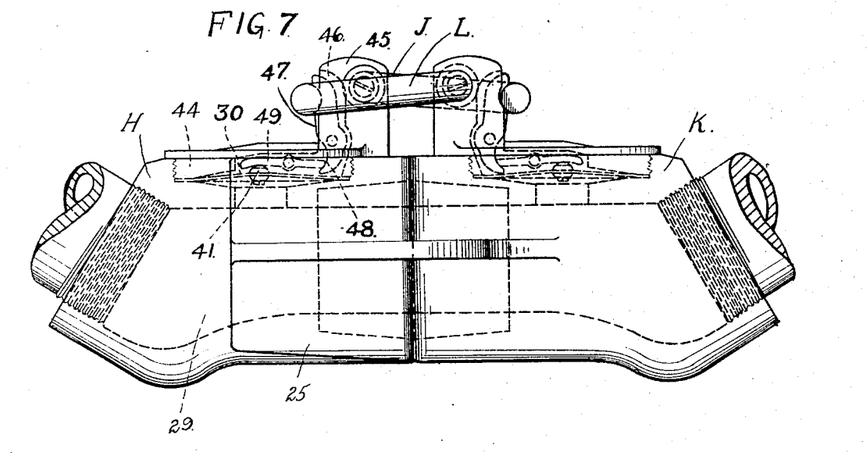
Fig. 7 is a side elevation of a different physical embodiment of the same inventive idea.
Figure 8:
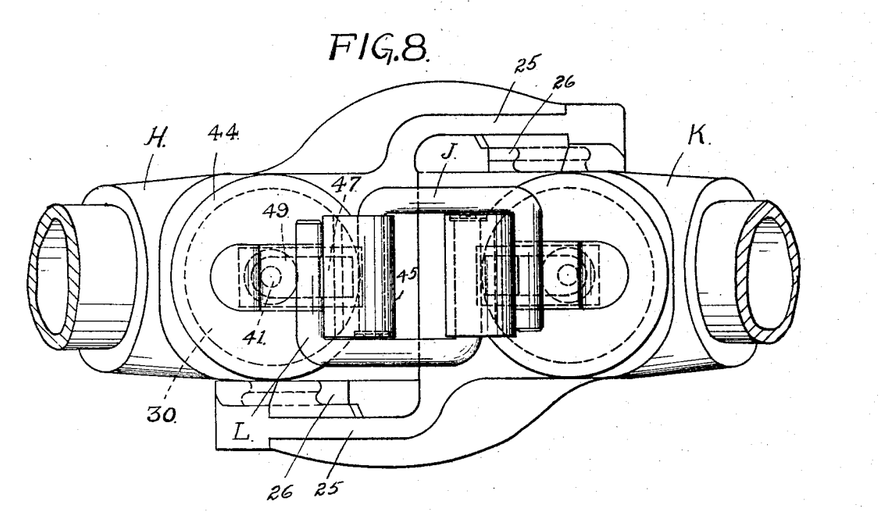
Fig. 8 is a plan view of the coupling shown in Fig. 7.
Figure 9:
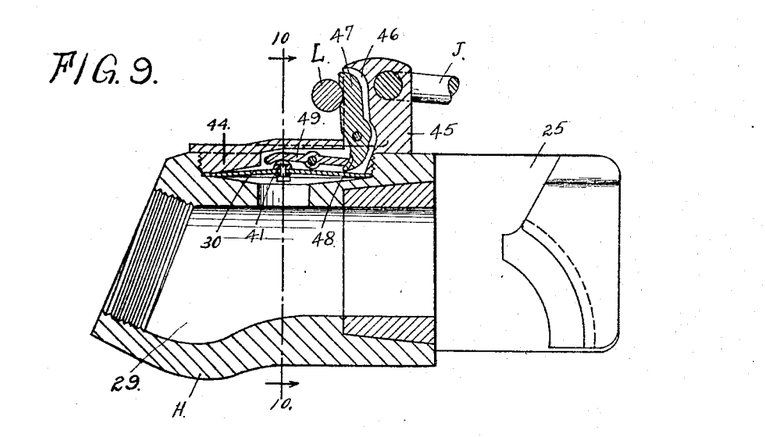
Fig. 9 is a longitudinal section of one of the coupler heads shown in the preceding two figures.
Figures 10, 11, 12:
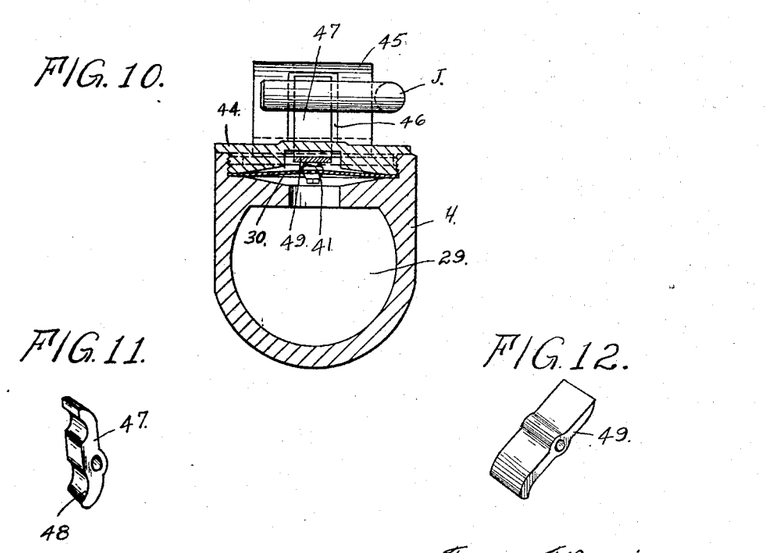
Fig. 10 is a cross sectional view on line 10—10 of Fig. 9.
Figs. 11 and 12 are detail views, in perspective, of parts of the mechanism for applying the fluid pressure to the locking link.

When the train line is under pressure the diaphragm 30 is expanded and the bell crank lever 40 rocked on its pivot 39 so that the upper end thereof is forced against the transverse portion 35 of the locking link, moving the link slightly so as to take up any looseness which there may be between the hook end 34 of the link and lug E of the coupler head B.

A different physical embodiment of the same idea is shown in Figs. 7 to 12 inclusive. The coupler head H is furnished with a diaphragm 30 kept in place by a plug 44 which is formed with a lug 45 to which is pivoted the locking link J adapted to engage the mating coupler head K. The lug 45 is formed with a slot 46 in which is pivoted a lever 47, the upper end of which bears against the hook end of the locking link L of coupler head K. The lower end of the lever 47 is in the form of a cam 48 engaged by the end of a lever 49 pivoted in the plug 44 against the other end of which the button 41 on the diaphragm bears. In the construction shown in the first six figures the pressure actuated device is arranged to bear against the pivoted end of the locking link. In the construction shown in Figs. 7 to 12 inclusive, the pressure actuated device bears against the hook end of the locking link.

Figure 13:
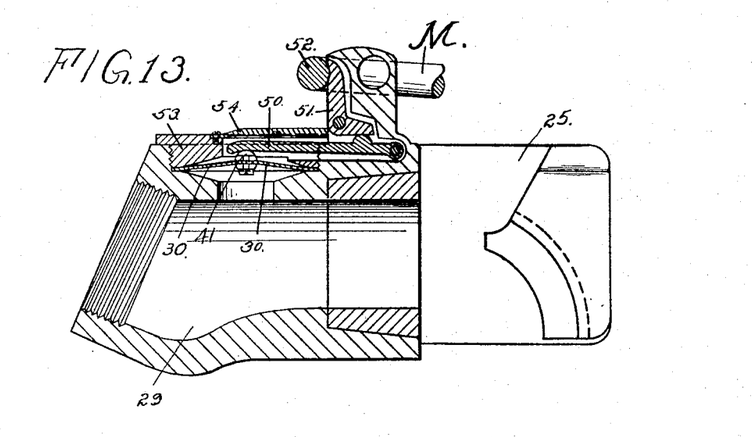
Figs. 13 to 16, inclusive, are views similar to Fig. 9 illustrating further modifications.

Figs. 13 to 16 inclusive, show four different modifications of the particular type of supplemental locking mechanism shown in Figs. 7 to 12 inclusive. In Fig. 13 the lever 50 against which the diaphragm operates is a lever of the second order with its power arm relatively long. The lever operates against a bell crank 51 which bears against the hook end 52 of the locking link M. For convenience in assembling, the plug 53 in which the supplemental locking mechanism is located, has an opening therein which is preferably closed by a plate 54.

Figure 14:
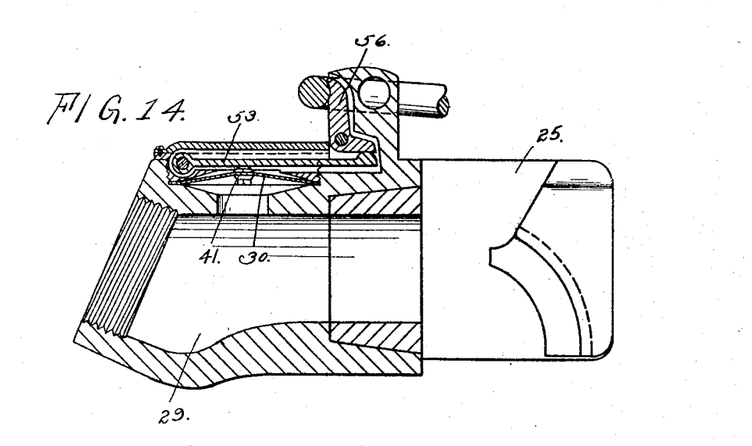

In the arrangement shown in Fig. 14 the lever 55 interposed between the diaphragm and the rock arm on the bell crank 56 is a third order lever with the power applied closer to the fulcrum than to the weight so that slight movement of the diaphragm produces an angular movement of considerable amplitude in the bell crank lever.

Figure 15:
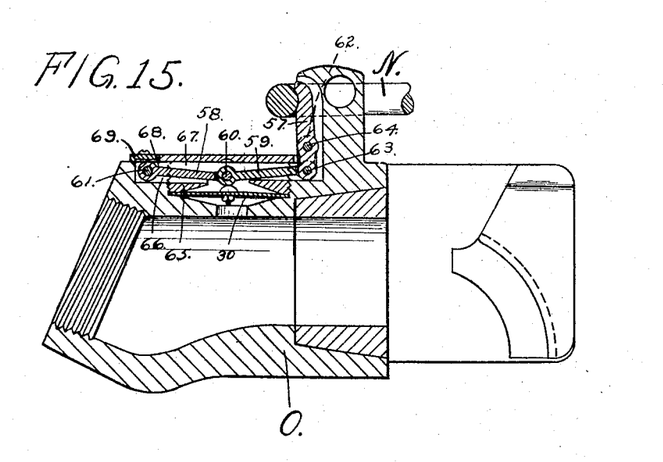

In Fig. 15 the rocking element 57, which bears against the locking link N of the mating coupler head, is operated by a pair of links 58, 59, the ends of which are pivoted together at 60, the other end of link 58 being pivoted to the coupler head O at 61, while the other extremity of link 59 is formed with an angular bend 62 which is pivoted at 63 to the rocking member 57 and at 64 to the pivot pin on which the rocking member 57 is mounted. In this arrangement the diaphragm 30 is held in place by a plug 65, the supplemental locking mechanism being arranged in a recess 66 in the coupler head 10. The links 58, 59 extend through a slot 67 in the plug. The recess 68 in the coupler head in which link 58 is pivoted is preferably covered by a cap 69.

Figure 16:
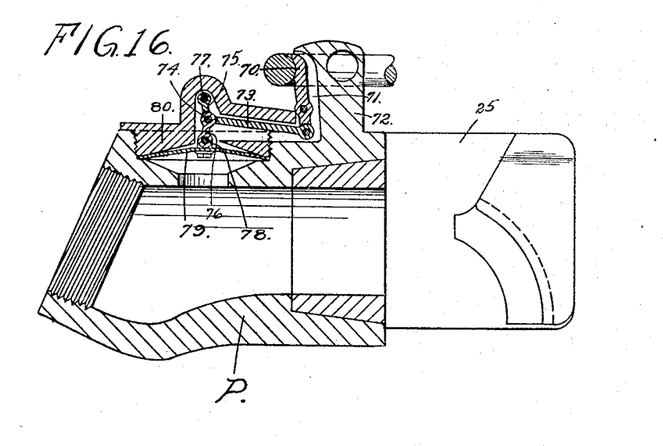
Figures 17, 18, 19:
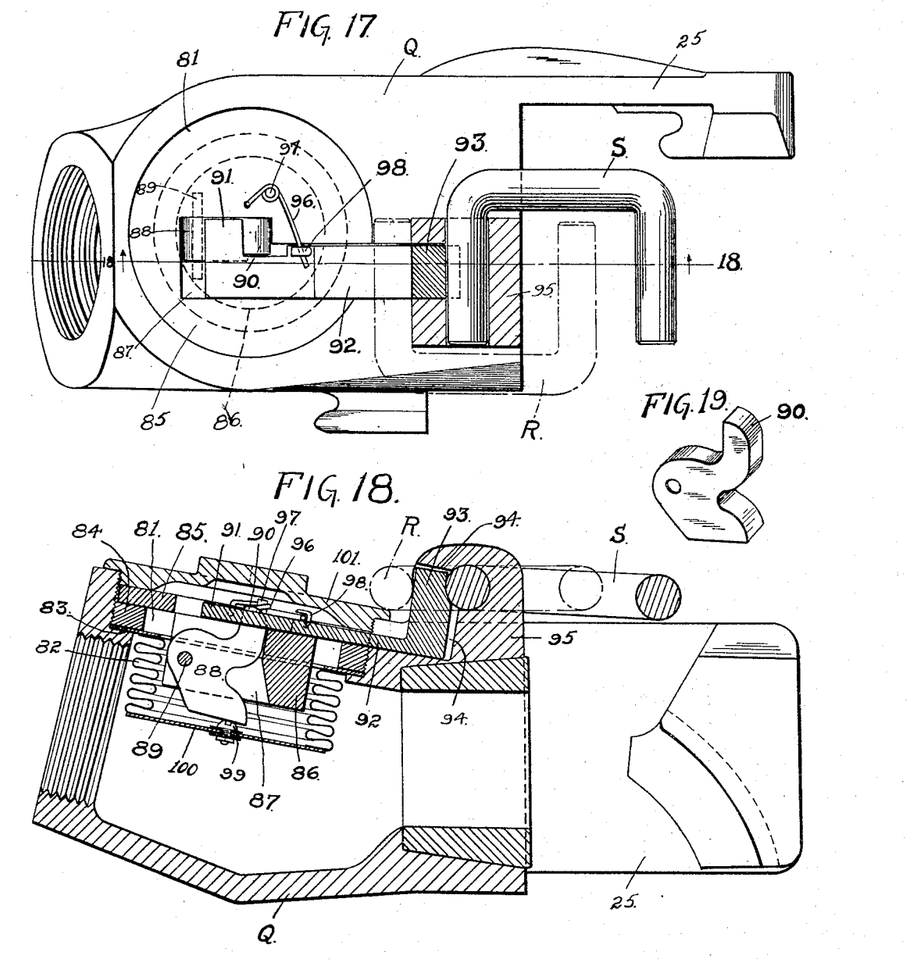
Fig. 17 is a plan view of a coupler head provided with a locking device actuated by fluid pressure through the instrumentality of a corrugated tubular diaphragm.
Fig. 18 is a sectional view on line 18—18 of Fig. 17.
Fig. 19 is a detail view, in perspective, of the lever by means of which the pressure on the diaphragm is transmitted to the take-up slide.
Figure 20:
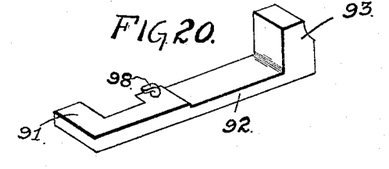
Fig. 20 is a similar view of the take-up slide.

In Fig. 16 the rocking member 70, which is arranged in a slot 71 in a lug 72, that is integral with the coupler head P, has pivoted to the lower end thereof a link 73 connected by the same pivot pin 74 to a link 75 and a link 76. The upper end of the link 75 is mounted on a fixed pivot 77, the lower end of link 76 being pivoted to a clevis 78 on the diaphragm 79. The diaphragm is kept in place and the link mechanism above described inclosed by a bonnet 80.

In Figs. 17 to 20 inclusive, another modification is shown, utilizing a corrugated tubular diaphragm, commonly called bellows diaphragm, by means of which the steam pressure is applied to the take-up member. The coupler head Q has an opening 81 in the top in which is arranged a corrugated tubular diaphragm 82, soldered or otherwise, secured to a ring 83 which is held in place by a nut 84. Resting on the nut is a disk 85 formed with a boss 86, the boss and disk being slotted as indicated at 87 to receive a lever 88 pivoted on a cross pin 89. The upper end 90 of the lever engages a projection 91 on a slide 92, the slide being arranged within the slot in the disk. The other end of the slide has a lug 93 which engages the locking link R of the mating coupler head. This end of the slide lies within a recess 94 in the locking projection 95 formed on the coupler head. The locking link S adapted to engage the mating coupler head is pivoted to the projection 95. 96 is a spring anchored to a pin 97 on disk 85 and engaging a lug 98 on the slide 92. The spring serves to move the slide out of engagement with the locking link R when the pressure against the diaphragm is relieved. The lever 88 bears against a button 99 on a disk 100 which is soldered or otherwise attached to diaphragm 82. The disk 85 is held in place by a screw plug 101.

While I have described my invention in certain preferred embodiments, it will be understood that further modifications might be devised without departure from the principles of the invention. Therefore I do not wish to be understood as limiting the invention to the exact constructions, arrangements and devices shown and described except so far as the claims are specifically so limited.

I claim:

1. The combination with the mating coupler heads of a train pipe coupling, of a locking device for locking said coupler heads together, and means arranged within one of said heads and actuated by fluid pressure for increasing the intimacy of engagement of the locking device with said coupler heads.

2. The combination with the mating coupler heads of a train pipe coupling, of a locking member attached to one of said heads and adapted to engage a projection on the other, and a fluid pressure actuated device arranged to engage said locking member.

3. The combination with the mating coupler heads of a train pipe coupling, of a hook attached to one of said heads and adapted to engage a projection on the other head, and a fluid pressure actuated device adapted to engage said hook.

4. The combination with the mating coupler heads of a train pipe coupling, of a locking device providing a loose connection between said coupler heads, and means arranged within the coupling actuated by fluid pressure in said coupling for absorbing looseness in said connection.

5. The combination with the mating coupler heads of a train pipe coupling, of a locking device providing a loose connection between said coupler heads, and means arranged within one of said coupling heads for absorbing looseness in said connection.

6. The combination with the mating coupler heads of a train pipe coupling, of a locking link pivoted to one of said coupler heads and adapted to engage the other head so as to provide a loose connection between said heads, and means comprising a slidable link-engaging member and a rocking member for operating the same actuated by fluid pressure in said coupling for taking up the looseness between said locking link and the coupler heads.

7. The combination with the mating coupler heads of a train pipe coupling, of a locking link pivoted to one of said coupler heads and adapted to engage the other head so as to provide a loose connection between said heads, and means within the coupler for taking up the looseness between said locking link and the coupler heads.

8. The combination with the mating coupler heads of a train pipe coupling, of a locking member attached to one of said heads, and a fluid pressure operated slidable element on the other head adapted to be engaged by said locking member.

9. The combination with the mating coupler heads of a train pipe coupling, of a locking member pivoted to one of said heads, and a fluid pressure operated slidable element on the other head adapted to be engaged by said locking member.

10. The combination with the mating coupler heads of a train pipe coupling, of a locking member pivoted to one of said heads, a diaphragm arranged in the other coupler head so as to be subjected to the fluid pressure in said coupling, and a movable element connected with said diaphragm which is adapted to be engaged by said locking member.

11. In combination, a coupler head having a locking member pivoted thereto, a diaphragm arranged in said head so as to be under the influence of fluid pressure in the port of the coupler head, and a movable element connected with said diaphragm which is adapted to be engaged by a locking member on a mating coupler head.

12. In combination, a coupler head having a locking member pivoted thereto, a diaphragm arranged in said head so as to be under the influence of fluid pressure in the port of the coupler head, a rocking element connected with said diaphragm, and means engaging said locking element adapted to be engaged by a locking member on a mating coupler head.

13. In combination, a coupler head provided with an upstanding lug, a locking member pivoted to said lug, the lug being formed on one side with a recess, a movable member arranged in said recess, a diaphragm under influence of fluid pressure in the port of the coupler, and a lever interposed between said rocking member and said diaphragm.

14. The combination with the mating coupler heads of a train pipe coupling, of locking means for locking said heads together comprising a link pivoted to one of said coupler heads, a take-up slide on the other head having a projection adapted to engage said link, a corrugated sheet metal tubular diaphragm arranged so as to be subjected to pressure within the coupling, and a lever interposed between said diaphragm and slide for the purpose described.

FRANK F. COGGIN.

Copies of this patent may be obtained for five cents each, by addressing the "Commissioner of Patents, Washington, D. C."